(12) United States Patent
Lam et al.

(10) Patent No.: US 6,845,197 B2
(45) Date of Patent: Jan. 18, 2005

(54) OPTICAL TAP

(75) Inventors: Yee Loy Lam, Singapore (SG); Yuen Chuen Chan, Singapore (SG); Bee Khuan Law, Singapore (SG)

(73) Assignee: Denselight Semiconductors Pte Ltd, Singapore (SG)

( * ) Notice: Subject to any disclaimer, the term of this patent is extended or adjusted under 35 U.S.C. 154(b) by 110 days.

(21) Appl. No.: 10/350,989

(22) Filed: Jan. 24, 2003

(65) Prior Publication Data

US 2003/0174960 A1 Sep. 18, 2003

(30) Foreign Application Priority Data

Jan. 25, 2002 (GB) .............................................. 0201787

(51) Int. Cl.$^7$ ................................................ G02B 6/26
(52) U.S. Cl. ........................................ 385/48; 385/45
(58) Field of Search ............................ 385/48, 45, 39, 385/46

(56) References Cited

U.S. PATENT DOCUMENTS 5,289,551 A * 2/1994 Nakama et al. ............... 385/45

6,047,096 A  4/2000 Augustsson

FOREIGN PATENT DOCUMENTS

EP         0 484 878 A2      5/1992

OTHER PUBLICATIONS

Search Report under Section 17(5); Application No. GB 0201787.9; Date of Search Jun. 6, 2002.

* cited by examiner

Primary Examiner—Frank G. Font
Assistant Examiner—Michael P. Mooney
(74) Attorney, Agent, or Firm—Beyer Weaver & Thomas LLP (57) ABSTRACT

The present invention relates to a semiconductor optical tap comprising: a multimode interferometer (MMI) (6); an input waveguide (1) coupled to the MMI; a first output waveguide (2) coupled to the MMI; and a second output waveguide (3) coupled to the MMI. The first and second output waveguides (2,3) overlap (d) such that unequal portions of light are coupled from the MMI into the first and second output waveguides (2,3). The input waveguide (1) and the first and second output waveguides (2,3) may have a rib structure. They may also be adiabatically tapered waveguides. The first and second output waveguides (2,3) may have different starting widths.

9 Claims, 10 Drawing Sheets

OPTICAL TAP

FIELD OF THE INVENTION

Optical taps are commonly employed in optical communication systems to do network monitoring. An optical tap is usually inserted into an optical path carrying optical signals of any kind and is able to tap out a portion of the optical signal propagating in the optical fiber without breaking or terminating the fiber link. In this way, the main fiber link is not disturbed, and at the same time, useful network information, such as the power, wavelength shift, polarization sensitivity as well as spectrum monitoring can be monitored from the tapped signal. As Dense Wavelength Division Multiplexing (DWDM) becomes more widely employed in optical networks, the network traffic would become much heavier, and it will be all the more important for network monitoring of the many wavelengths traveling in a single optical fiber. Optical taps would thus become greatly needed in these applications.

BACKGROUND TO THE INVENTION

Typical optical taps that are commonly seen in the market are those that use optical fibers to achieve optical tapping. One method of obtaining an optical tap with fibers is done by fusing two fibers together, whose tips are cleaved and polished. By varying the cleaved angle during fusion splicing, or by the use of materials (such as $TiO_2$ or Al) with different indices of refraction, variable tap ratios can be obtained [Noureddin M. Ibrahim and Ismail H. A. Fattah, "Narrow-beam aluminium-mirrored fiber optical-taps with controllable tapped power," IEEE Journal of Selected Topics In Quant Electronics., Vol. 2, No. 2, pp. 221–225, June 1996]. Another method makes use of the fused biconical fiber technology, whereby control of the tap ratio is through the fiber structure and dimensions during fusion splicing [D. R. Moore, Z. X. Jiang and V. J. Tekippe, "Optimization of tap couplers made by the FBT process," Technical Paper, Gould Fiber Optics], [Tzong-Lin Wu, Hug-chun Chang, "Vectorial analysis of fiber-core effects in weakly fused couplers", IEEE Photonics Technology Letters, Vol. 9, No. 2, February 1997.].

A further method utilises a bend fiber/prism/photodiode assembly [John P. Palmaer, "Fiber optic tap and method of fabrication," U.S. Pat. No. 0,439,875]. In this method, an optical fiber is bent to increase the tendency for light to escape from the bent region. By lapping and polishing the bent region perpendicular to the radius of the bend, it is possible to enhance the tendency for light to escape from the bend. A prism is then used to direct the light to the associated photodiode detector. The tap ratio is controlled by the depth of lapping into the fiber.

However, the fused fiber optical tap has the disadvantages of being difficult to manufacture and it is sensitive to manufacturing tolerances. Precise machinery is needed to control the fabrication parameters, such as thickness of the thin film, radius of the fiber core and lapping depth. Also, repeatability of the manufacturing process is an issue, for example, properties of thin films, like $TiO_2$, used in the manufacture of optical taps have wide variation even among those produced by the same deposition process. Moreover, fiber based taps are basically discrete components and thus are bulky. The coupling region can extend to several millimeters and the packaged tap/coupler can be several centimeters in length. According to the present invention, a new type of optical tap based on semiconductor technology is proposed.

SUMMARY OF THE INVENTION

According to the present invention an optical tap comprises:

a multimode interferometer (MMI);

an input waveguide coupled to the MMI;

a first output waveguide coupled to the MMI;

a second output waveguide coupled to the MMI, wherein the first and second output waveguides overlap such that unequal portions of light are coupled from the MMI into the first and second output waveguides.

Preferably, less than 20% of the output light is coupled into the second output waveguide. More preferably, less than 15% of the output light is coupled into the second output waveguide.

Preferably, the input and first and second output waveguides have a rib structure.

Preferably, the input and output waveguides are adiabatic tapered waveguides. Tapering the input and/or output waveguides reduces excess power loss of the device.

In a first embodiment of the invention, the first and second output waveguides have the same starting width.

In a second embodiment, the first and second output waveguides have different starting widths, the second output waveguide having a smaller starting width.

In one embodiment, the first output waveguide is aligned with the optical axis of the MMI.

In an alternative embodiment, the first output waveguide is offset from the axis of the MMI. Offsetting the first output waveguide from the central axis of the input waveguide and MMI reduces excess power loss of the device.

BRIEF DESCRIPTION OF THE DRAWINGS

Examples of the present invention will now be described with reference to the accompanying drawings in which.

DETAILED DESCRIPTION

Figure 1A:
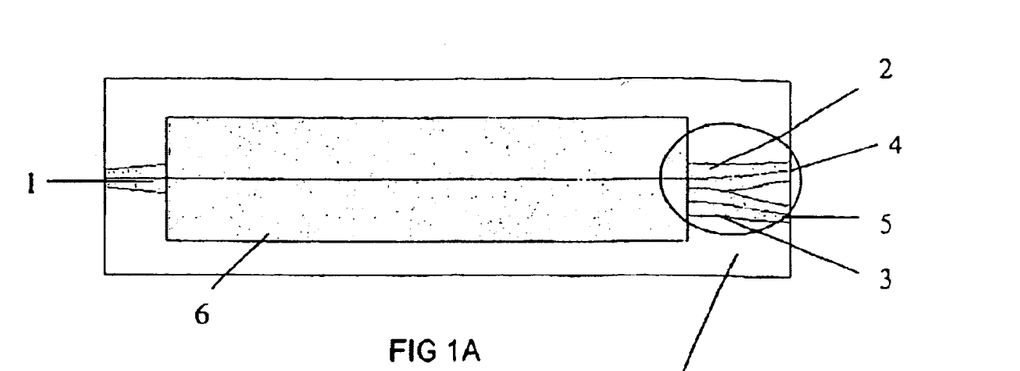
FIG. 1A shows a plan view of a first embodiment of the invention.
Figure 1B:
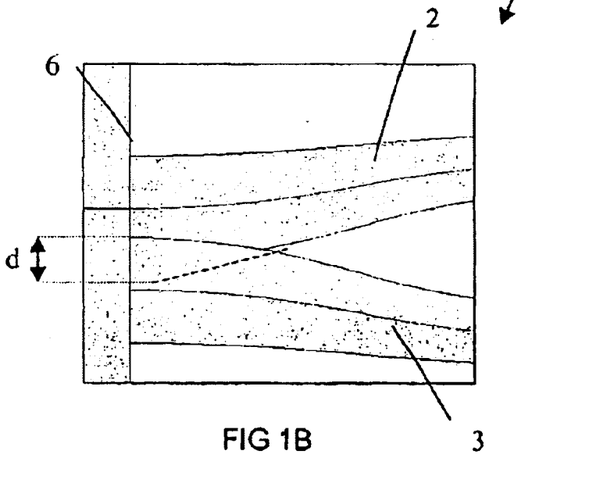
FIG. 1B shows a detailed view of the output ports of the first embodiment.
Figure 1C:
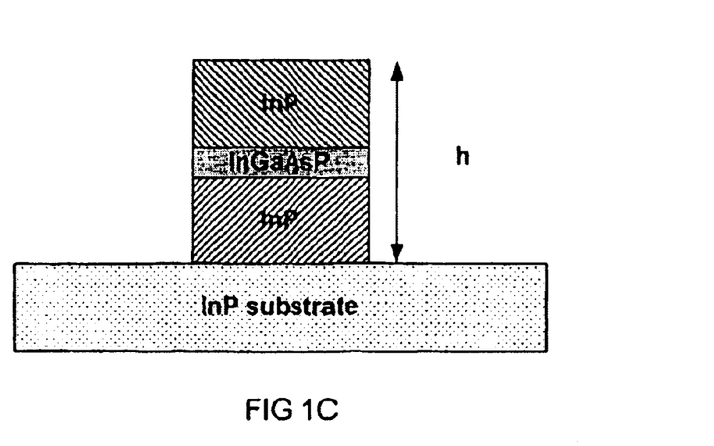
FIG. 1C shows a cross-section of the waveguide structure.

The designed optical tap is based on a semiconductor waveguide structure. The layout of the optical tap is shown in FIGS. 1A to 1C. A rib waveguide structure having a rib height h of 4.7 μm as shown in FIG. 1C is used in the design of the optical tap so as to obtain a high optical confinement when guiding the light from the input waveguide 1 and, more importantly, at the output waveguides 2,3 for minimal coupling once the light is channelled to the output ports 4,5. Adiabatic tapered waveguides are employed for smooth modal evolution from the input waveguide 1 to the MMI 6, and then to the output waveguides 2,3, to minimize excess power loss introduced into the device.

Figure 2:
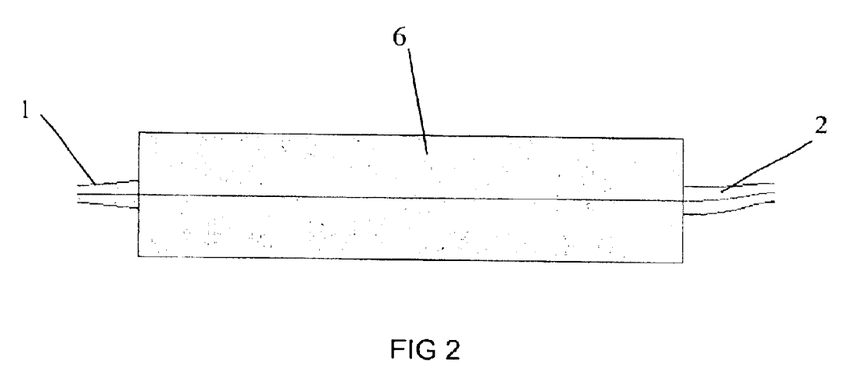
FIG. 2 shows an optimised design for maximum power transfer from the input port to a single output port.

Initially, a 1×1 MMI coupler shown in FIG. 2 is designed and optimized for maximum power transfer from the input to a single output waveguide 2. In the optimised design (wherein the output power is 99% of the input power), the input wavelength has a taper from 2.5 μm to 4.6 μm over 100 μm, the MMI coupler length is 830 μm, and its width is 20 μm, and the output waveguide has a taper from 4.6 μm to 2.5 μm over 200 μm. Next, by employing a second symmetrical output waveguide 3 and by varying the overlapping distance d of the two output waveguides 2,3, the amount of the coupling ratio R can be varied in a controlled manner. The coupling ratio R is defined as the percentage of the power output to both output waveguides 2,3 which is output to the second output waveguide 3.

Figure 3A:
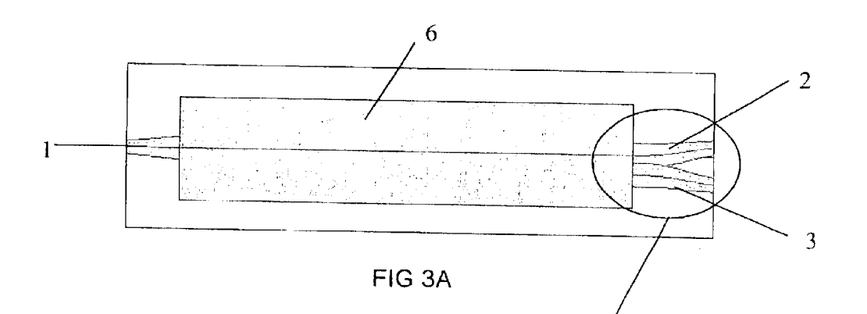
FIG. 3A shows a plan view of a first embodiment of the invention.
Figure 3B:
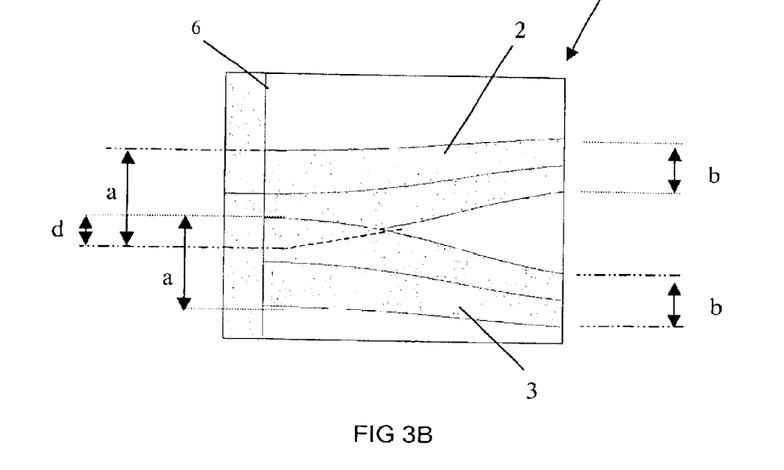
FIG. 3B shows a detailed view of the first embodiment.
Figure 4A:
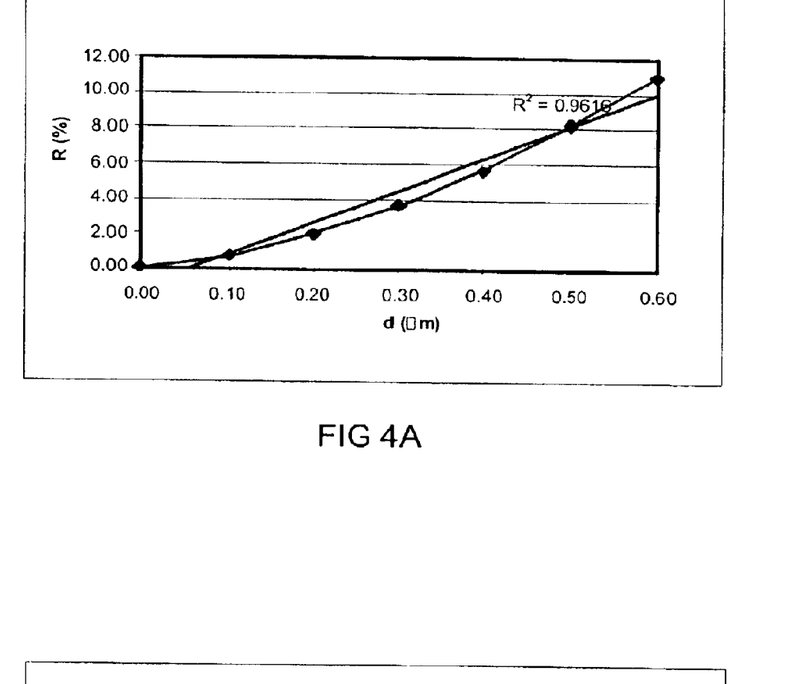
FIG. 4A shows the relationship of the coupling ratio to the output waveguide overlap distance for the first embodiment.
Figure 4B:
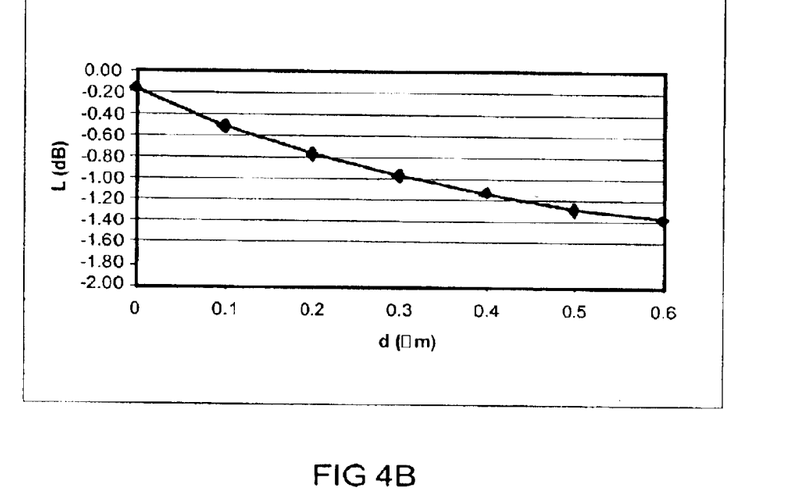
FIG. 4B shows the relationship of the power loss to the output waveguide overlap for the first embodiment.

FIGS. 3A and 3B show the layout of a first embodiment of the optical tap. The first embodiment has output waveguides 2,3 having the same start widths a of 4.6 μm and final widths b of 2.5 μm. The relationship of the coupling ratio R versus the output waveguide overlap distance d is shown in FIG. 4A. Curve-fitting of the data points reveals a good linear relationship between output waveguide overlap d and coupling ratio R. FIG. 4B shows a plot of power loss L vs output waveguide overlap d for this embodiment. The maximum power loss for a 10% coupling ratio is about 1.4 dB.

Figure 5A:
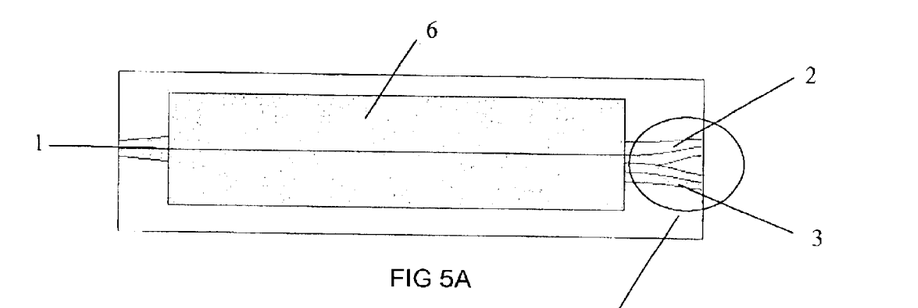
FIG. 5A shows a plan view of a second embodiment of the invention.
Figure 5B:
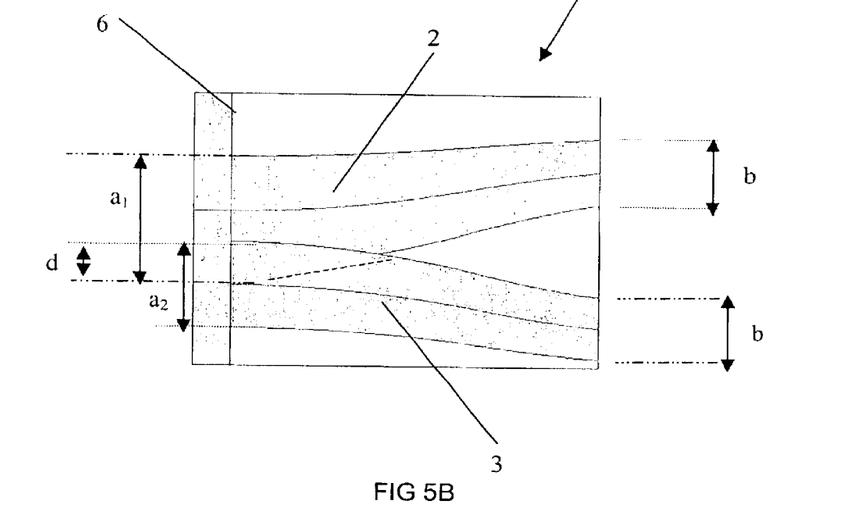
FIG. 5B shows a detailed view of the second embodiment.
Figure 6A:
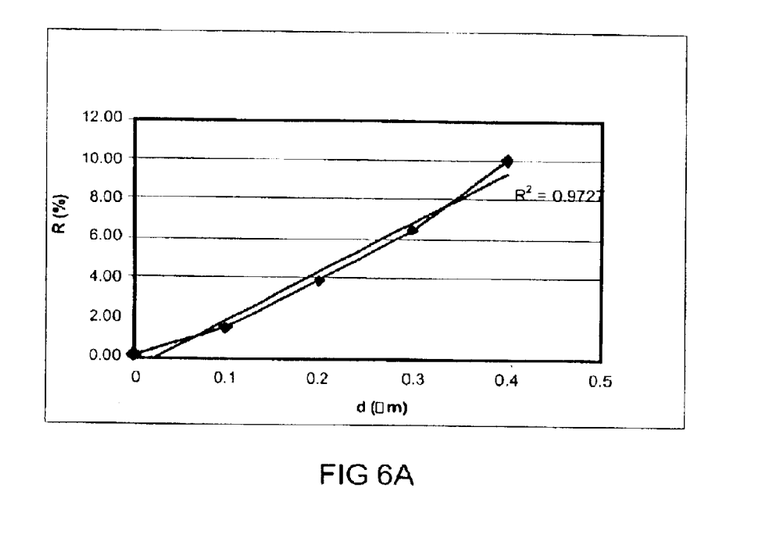
FIG. 6A shows the relationship of the coupling ratio to the output waveguide overlap for the second embodiment.
Figure 6B:
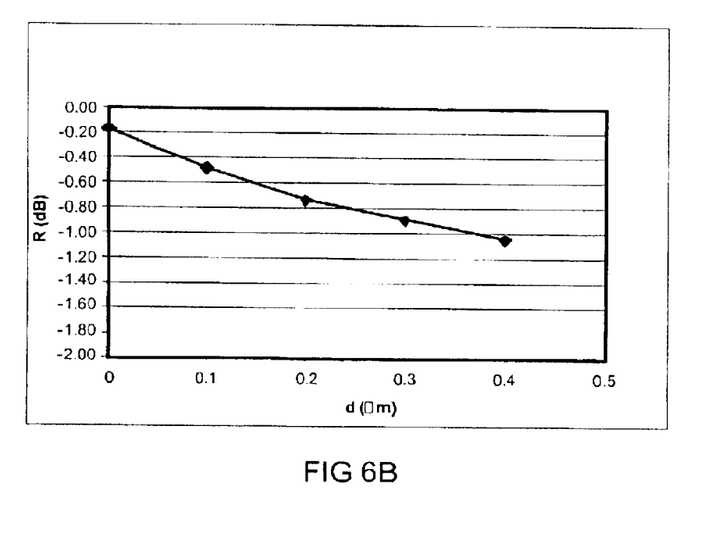
FIG. 6B shows the relationship of the power loss to the output waveguide overlap for the second embodiment.

FIGS. 5A and 5B show a second embodiment wherein the output waveguides 2,3 have different output waveguide taper start widths ($a_2$=3.6 μm for the second output waveguide 3 and $a_1$=4.6 μm for the first output waveguide 2) as seen in the layout in FIG. 5B. The final width b is equal to 2.5 μm for both waveguides. Simulated results of FIGS. 6A and 6B show that the coupling ratio R can be controlled in a similar manner, though with different overlap dimensions d. As shown in FIG. 6B, the maximum excess power loss L at a 10% coupling ratio R of 1 dB is lower than the previous embodiment.

Figure 7A:
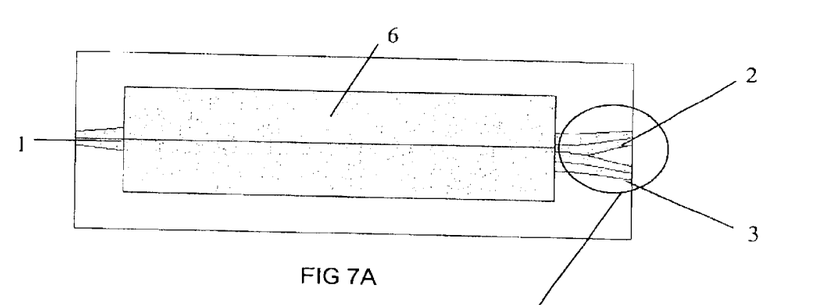
FIG. 7A shows a plan view of a third embodiment.
Figure 7B:
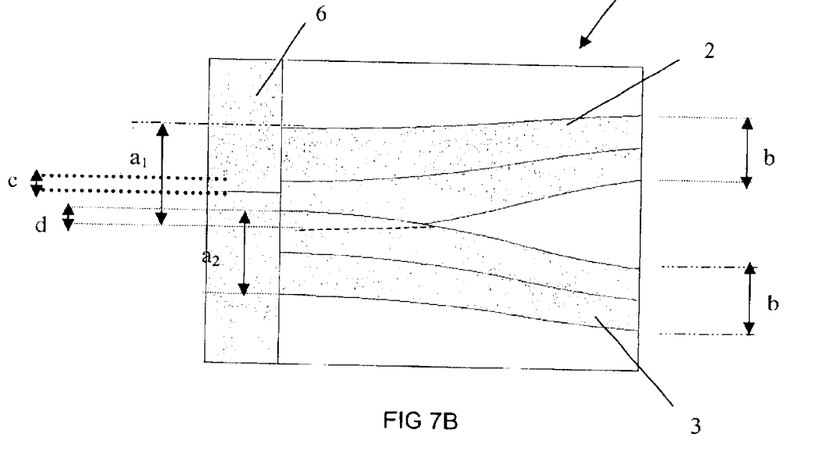
FIG. 7B shows a detailed view of the third embodiment.
Figure 8A:
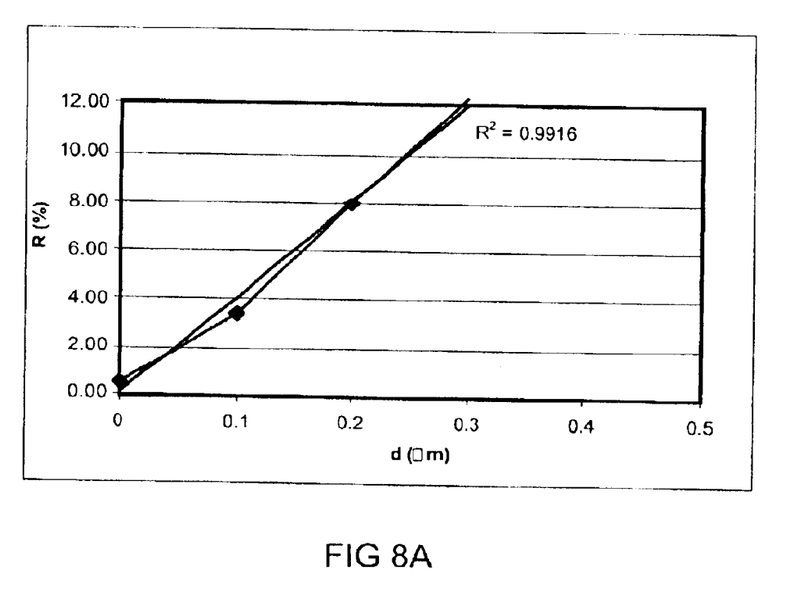
FIG. 8A shows the relationship of the coupling ratio to the output waveguide overlap for the third embodiment.
Figure 8B:
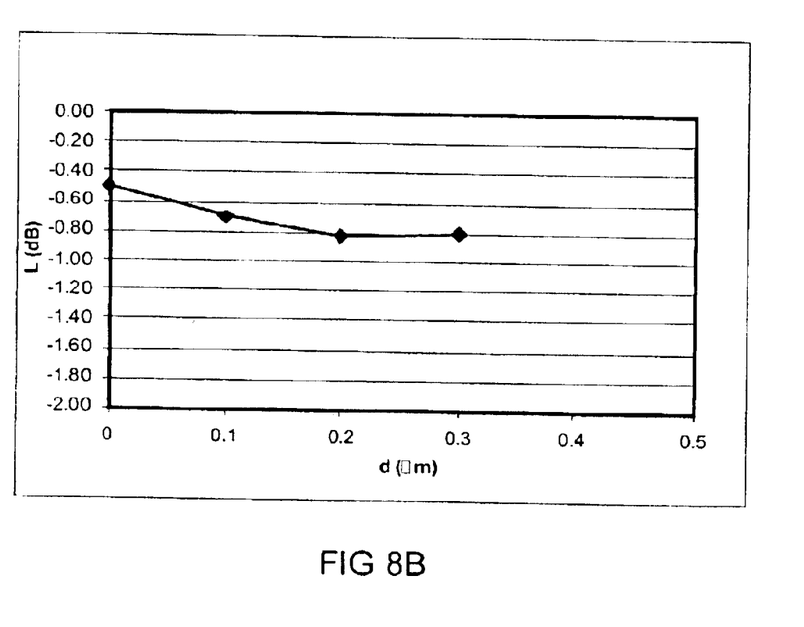
FIG. 8B shows the relationship of the power loss to the output waveguide overlap for the third embodiment.

FIGS. 7A and 7B show another embodiment, with the dimensions the same as the second embodiment, but with the first output waveguide 2 offset by c=0.5:m from the central axis of the input waveguide 1 and the MMI 6. A similar linearly varying coupling ratio R is obtained, with different output waveguide overlap dimensions d as shown in FIG. 8A. Even lower maximum power loss L of 0.8 dB at 10% coupling ratio can be achieved, as seen in FIG. 8B.

Figure 9A:
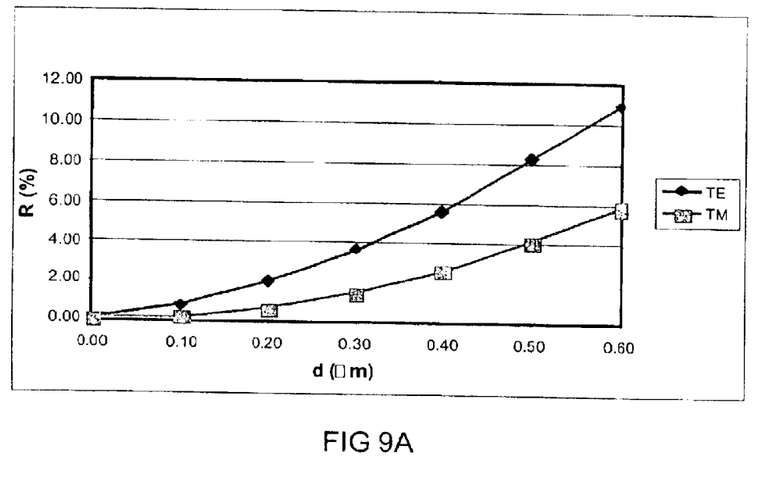
FIGS. 9A and 9B show the polarisation insensitivity of the first embodiment; and, FIGS. 10A and 10B show the wavelength dependence of the first embodiment.
Figure 9B:
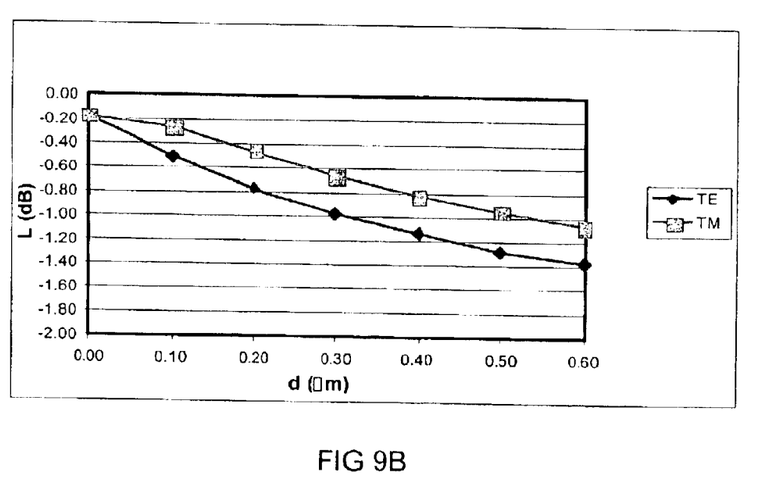
Figure 10A:
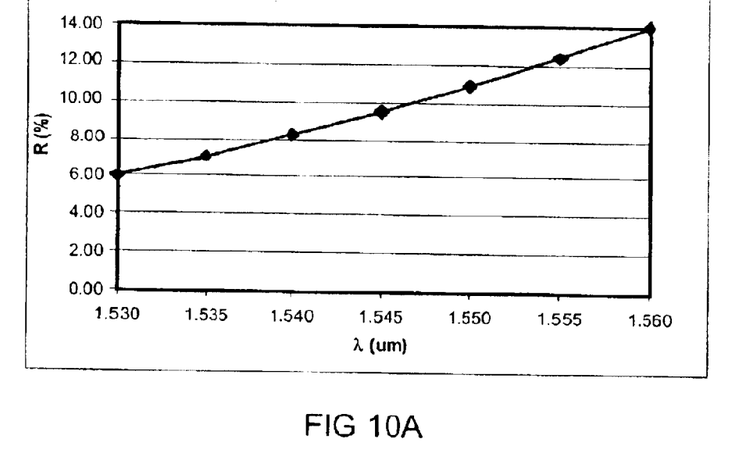
Figure 10B:
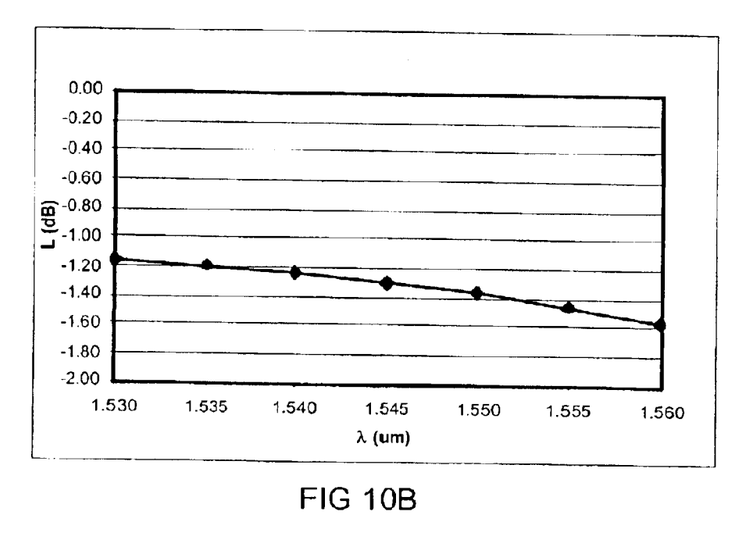

The optical tap was checked for polarization sensitivity and wavelength dependency. Polarization sensitivity and wavelength dependency for this device were found to be weak in comparison with conventional optical taps. With further device design optimization, these effects can be made negligible. A simulation using the embodiment shown in FIG. 3, was carried out, and it was found that the designed structure is rather polarization insensitive, as shown in FIGS. 9A and 9B. The embodiment of FIG. 3 was also checked for wavelength dependency over the 'C' band (1528 nm to 1562 nm). As seen in the simulation results of FIGS. 10A and 10B, the optical tap's performance on coupling ratio R and excess power loss L is consistent and fairly wavelength tolerant. Polarization insensitivity and wavelength tolerance can be further improved by designing a smaller MMI 6 with shorter coupler length and width. A smaller MMI 6 dimension would make the optical device less sensitive to polarization and more tolerant of wavelength fluctuations.

The design of the optical tap is based on semiconductor technology. By building optical tap based on semiconductor technology, it allows the device to be monolithically integrated with other photonic circuits, (for example in an optical channel monitor (OCM), or to a linear array of detectors, to be used for optical network monitoring). The planar integration of such devices brings about many advantages, such as compactness, reduced cost, which is achieved by integrating complex functions, and even simpler manufacturing process, when many chips can be made on a single wafer. Also, as optical taps are mostly employed by directly inserting them along an optical fiber link, it is critical to minimize any excess power loss that is introduced into the fiber link, and the use of planar integration would minimize this problem. The present design is also simple and has a small dimension of 1 mm length by 20 μm width. As compared to the conventional Y-branch whereby an abrupt change of the optical mode occurs, the present design makes use of the interferometric effects of the MMI to couple light out to the two output waveguides with no sudden mode change, thereby achieving very low loss. Last but not least, it is simpler to fabricate an optical tap that can be tailored conveniently to the unique requirements of a given system, by designing the dimensions on the mask layout rather than through the tedious fabrication process used in the conventional fused fiber technique. The performance achievable in the monolithic optical tap disclosed above allows for flexibility in the integration design of a laser source with a monitoring diode as well as that of passive waveguides with photodetectors.

What is claimed is:

1. An optical tap comprising:

a multimode interferometer (MMI);

an input waveguide coupled to the MMI;

a first output waveguide coupled to the MMI; and a second output waveguide coupled to the MMI, wherein the first and second output waveguides overlap such that unequal portions of light are coupled from the MMI into the first and second output waveguides.

2. An optical tap according to claim 1, wherein less than 20% of the output light is coupled into the second output waveguide.

3. An optical tap according to claim 1, wherein less than 15% of the output light is coupled into the second output waveguide.

4. An optical tap according to claim 1, wherein the input and first and second output waveguides have a rib structure.

5. An optical tap according to claim 1, wherein the input and output waveguides are adiabatic tapered waveguides.

6. An optical tap according to claim 1, wherein the first and second output waveguides have the same starting width.

7. An optical tap according to claim 1, wherein the first and second output waveguides have different starting widths, the second output waveguide having a smaller starting width.

8. An optical tap according to claim 1, wherein the first output waveguide is aligned with the optical axis of the MMI.

9. An optical tap according to claim 1, wherein the first output waveguide is offset from the axis of the MMI.

* * * * *